(12) United States Patent
Lau

(10) Patent No.: US 8,963,925 B2
(45) Date of Patent: *Feb. 24, 2015

(54) MAXIMIZE DATA VISIBILITY USING SLATED VIEWER

(75) Inventor: Shelley Lau, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1839 days.

This patent is subject to a terminal disclaimer.

(21) Appl. No.: 12/109,879

(22) Filed: Apr. 25, 2008

(65) Prior Publication Data

US 2008/0204452 A1     Aug. 28, 2008

Related U.S. Application Data

(63) Continuation of application No. 11/295,913, filed on Dec. 7, 2005, now Pat. No. 7,414,627.

(30) Foreign Application Priority Data

Dec. 7, 2004    (CA) .................................. 2489613

(51) Int. Cl.
     *G06T 11/00*      (2006.01)
     *G06F 17/21*      (2006.01)

(52) U.S. Cl.
     CPC .................................. *G06F 17/214* (2013.01)
     USPC ............................. 345/471; 345/649; 345/619

(58) Field of Classification Search
     CPC ............ G06F 17/24; G06T 3/60; G06T 11/60

USPC .......................................... 345/471, 649, 619
See application file for complete search history.

(56) References Cited

U.S. PATENT DOCUMENTS

| | | | |
|---|---|---|---|
| 4,928,233 A * | 5/1990 | Millis | ............................ 345/419 |
| 6,362,817 B1 | 3/2002 | Powers et al. | |
| 6,456,732 B1 * | 9/2002 | Kimbell et al. | ............... 382/112 |

OTHER PUBLICATIONS

Szeliski et al., "Creating Full View Panoramic Image and Environment Maps", Computer Graphics Proceedings, SIGGRAPH, 97, pp. 251-258, Published, New York, NY, USA, 1997, abstract.
Ryoo et al., "Full-View Panoramic Navigation Using Orthogonal Cross Cylinder", Journal of WSCG, vol. 10, No. 2, pp. 381-388, 2002, abstract.

(Continued)

*Primary Examiner* — Michelle L Sams
(74) *Attorney, Agent, or Firm* — Steven M. Greenberg, Esq.; CRGO Law

(57) ABSTRACT

A slanted viewer is provided to maximize data visibility. In the context of computer graphics and a rendering technique, the slanted viewer's use of three-dimensional rendering provides an instant view of full data without compromising the visibility of other view areas or data and with minimum user interactions. The slanted viewer combines the use of two-dimensional and three-dimensional concepts to enhance, as well as to preserve, a well-established user interaction environment and navigation system. The slanted viewer serves effectively in viewers showing extended length of text or objects horizontally.

16 Claims, 5 Drawing Sheets

(56) References Cited

OTHER PUBLICATIONS

Bhaniramka et al., "OpenGL Volumizer" A Toolkit for High Quality Volume Rendering of Large Data Sets, ACM Digital Library, 2002, pp. 45-53.
Brown, "A 3D User Interface for Visualization of Web-Based Data-Sets", ACM Digital Library, 1998, 6 pgs, abstract Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Ritter et al., "Illustrative Shadows: Integrating 3D and 2D Information Displays", ACM Digital Library, 2003, pp. 166-173.

* cited by examiner

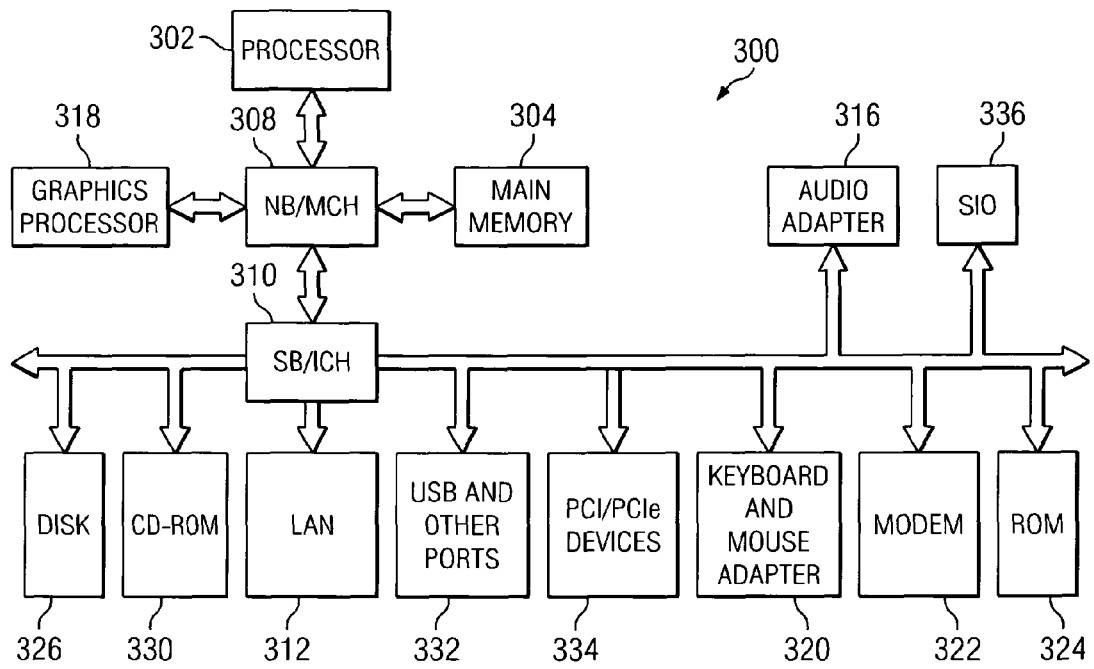

FIG. 3

| org.eclipse.emf.ecor... | org.eclipse.emf.ecore.editor_1.1.0 |
| org.eclipse.emf.ecor... | org.eclipse.emf.ecore.xmi_1.1.0 |
| org.eclipse.emf.ecor... | org.eclipse.emf.ecore_1.1.0 |
| org.eclipse.emf.edit... | org.eclipse.emf.edit.ui_1.1.0 |
| org.eclipse.emf.edit... | org.eclipse.emf.edit_1.1.0 |
| org.eclipse.emf.map... | org.eclipse.emf.mapping.ui_1.1.0 |
| org.eclipse.emf.map... | org.eclipse.emf.mapping.xsd2ecore.editor_1.1.0 |
| org.eclipse.emf.map... | org.eclipse.emf.mapping.xsd2encore_1.1.0 |

FIG. 5          FIG. 6

| Name | Size | Type | Modified |
|---|---|---|---|
| com.ibm.wsappdev... | | File Folder | 11/18/2003 5:35 PM |
| org.apache.ant_1.5.3 | | File Folder | 11/18/2003 5:35 PM |
| org.apache.lucene_... | | File Folder | 11/18/2003 5:35 PM |
| org.apache.xerces_... | | File Folder | 11/18/2003 5:35 PM |
| org.eclipse.ant.core... | | File Folder | 11/18/2003 5:35 PM |
| org.eclipse.compare... | | File Folder | 11/18/2003 5:35 PM |
| org.eclipse.core.boo... | | File Folder | 11/18/2003 5:35 PM |
| org.eclipse.core.res... | | File Folder | 11/18/2003 5:35 PM |
| org.eclipse.core.res... | | File Folder | 11/18/2003 5:35 PM |
| org.eclipse.core.run... | | File Folder | 11/18/2003 5:35 PM |
| org.eclipse.debug.c... | | File Folder | 11/18/2003 5:35 PM |
| org.eclipse.debug.ui... | | File Folder | 11/18/2003 5:35 PM |
| org.eclipse.draw2d... | | File Folder | 11/18/2003 5:35 PM |
| org.eclipse.draw2d_... | | File Folder | 11/18/2003 5:35 PM |
| org.eclipse.emf.cod... | | File Folder | 11/18/2003 5:35 PM |
| org.eclipse.emf.cod... | | File Folder | 11/18/2003 5:35 PM | plugins

Select an item to view its description.

See also:
My Documents
My Network Places
My Computer

*FIG. 4*

MAXIMIZE DATA VISIBILITY USING SLATED VIEWER

CROSS-REFERENCE TO RELATED APPLICATION

This application is a Continuation of U.S. application Ser. No. 11/295,913, filed Dec. 7, 2005, now U.S. Pat. No. 7,414,627 which claims priority to Canadian Patent Application No. 2,489,613, filed Dec. 7, 2004, which are incorporated herein by reference in their entirety.

BACKGROUND OF THE INVENTION

1. Technical Field

The present invention relates to maximizing data visibility. Particularly, the present invention provides a slanted viewer that uses depth as a three-dimensional volume to provide an instant view of full data without compromising the visibility of other view areas or data in the well-established two-dimensional environment and conventional navigation to which users are accustomed.

2. Description of Related Art

A file viewer is an application used for displaying file and directory listings and information. A file viewer may also control searching functions and file type associations (based on filename extensions). A file viewer may also make use of navigational arrows (back and forward) for moving between recently visited directories. This feature has proven to be a useful feature that has been emulated by other file browsing systems.

In the state of today's information technology, the amount of information available grows exponentially, particularly compared to the amount of space that is available for display or visualization. Current display devices are often described as rectangular, flat screens. Very often lengthy data being displayed would be hidden off the screen or viewing area. Currently, this kind of viewing limitation can be addressed by use of commonly known scroll bars in either the horizontal axis or the vertical axis or by resizing the viewing area. Users often manually 'scroll' within the viewer to or 'expand' the viewer as a means of revealing the hidden portion of the data.

Although scrolling or expanding a viewer is functionally satisfying, it is lacking the instant preview of full content. Furthermore, the aforementioned way of increasing the visibility of one data is in a trade off of lesser visibility of another set of data. This is due to the nature of the two-dimensional viewing facility. If one expands a view area resided in a 'viewer,' the area that is 'behind' it would get covered up further. The same issue holds true when the user scrolls to the hidden area; things that were visible would become hidden. Lastly, viewing hidden data requires constant manual or human interactions to perform such operations as scrolling or expanding.

SUMMARY OF THE INVENTION

The present invention provides a method, apparatus and computer instructions to maximize data visibility to a user through the use of a slanted viewer. The exemplary aspects of the present invention use three dimensions, in the context of computer graphics and a rendering technique, to provide an instant view of full data without compromising the visibility of other view areas or data and with minimum user interactions. The slanted viewer combines the use of two-dimensional and three-dimensional concepts to enhance, as well as to preserve, a well-established user interaction environment and navigation system. The slanted viewer serves effectively in viewers showing extended length of text or objects horizontally.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a data processing system in which the present invention may be implemented;

FIG. 4 is a diagram illustrating an exemplary view of a conventional viewer;

FIG. 5 is a diagram illustrating an exemplary view of the partial file or folder names that are viewed in the convention viewer;

FIG. 6 is a diagram illustrating an exemplary view of the complete file or folder names that may be normally hidden in a convention viewer when the columns are narrowed;

DETAILED DESCRIPTION OF THE INVENTION

Figure 1:
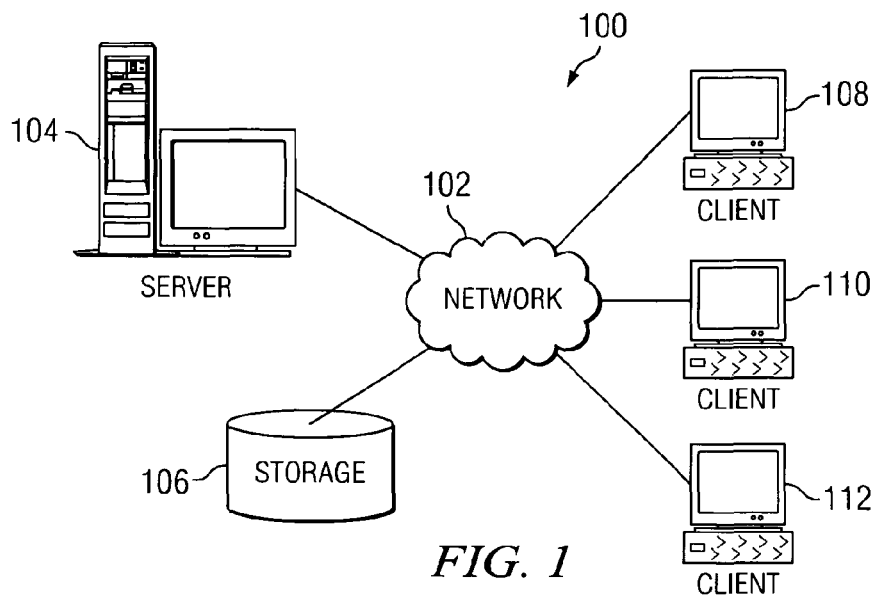
FIG. 1 is a pictorial representation of a network of data processing systems in which the present invention may be implemented.
Figure 2:
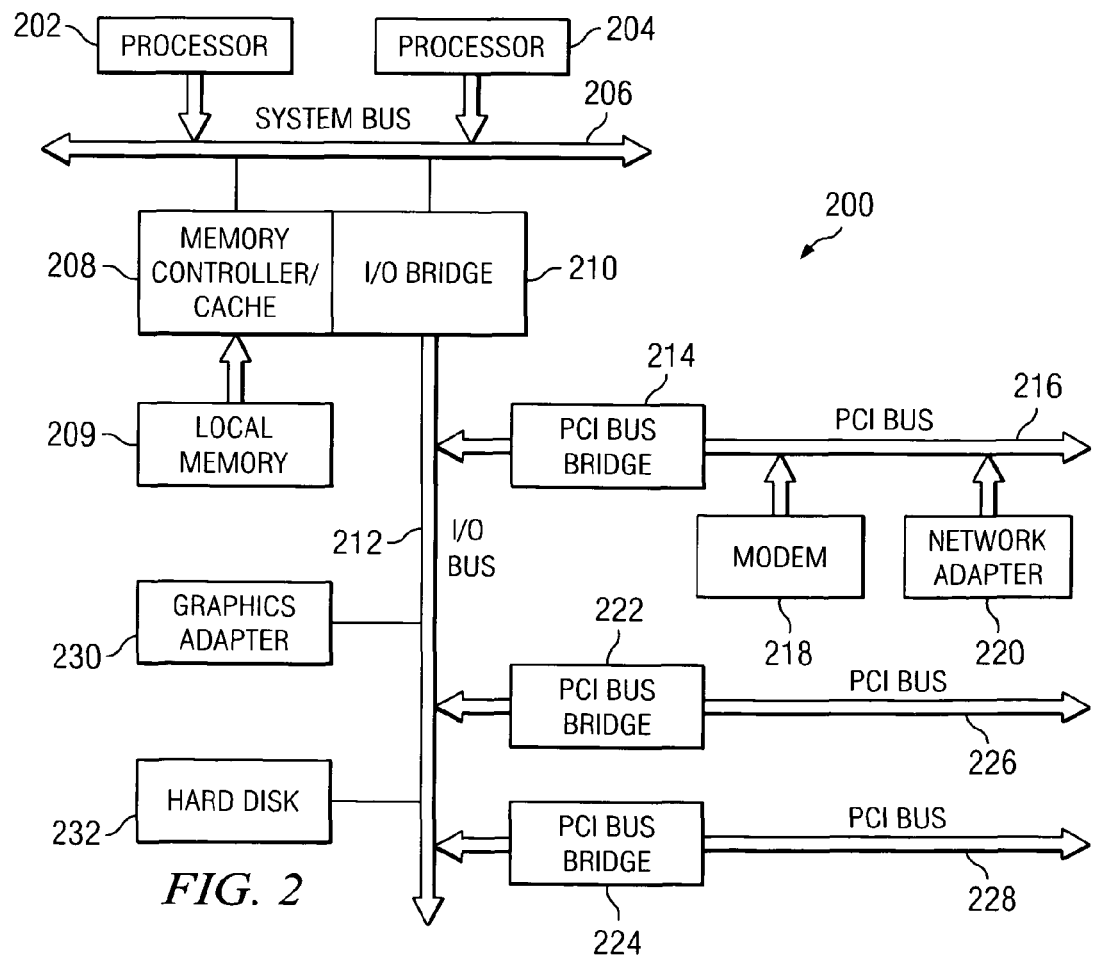
FIG. 2 is a block diagram of a data processing system that may be implemented as a server in accordance with a preferred embodiment of the present invention.

The present invention provides a method, apparatus and computer instructions in a data processing system to maximize data visibility to a user through the use of a slanted viewer. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Although the invention is a general-purpose technique and addresses a much broader issue, the exemplary aspects of the presently claimed invention are directed to a file viewer. The particular application of interest is the table viewer or list viewer of a file viewer. FIG. 4 depicts an exemplary view of a conventional viewer. In this conventional viewer, the file or folder names are displayed in a multi-column table. Very often the complete text of the name, size, type and modified columns may not be fully displayed in the viewer, given limited space, and a portion of the displayed text is hidden.

In many cases, partial text is neither meaningful nor immediately comprehensible to a user. To adjust the visibility, the user may use the option of expanding the width of the column. As the user expands the column width, the information to the right is gradually hidden from the screen. In order to view the information that has been hidden off the screen, the user would need to scroll within a viewer to or expand the viewer to see the rest of the information.

FIG. 5 depicts an exemplary view of the partial file or folder names that are viewed in the convention viewer of FIG. 4. As depicted in this diagram, the file or folder names are not readily meaningful to the user as a portion of the text has been hidden due to the column being narrowed to allow the other details of the files or folders (e.g. size, type, modified) to be viewed by the user. The partial view shown in FIG. 5 limits the view of the entire text of the files or folders names which are shown in FIG. 6. FIG. 6 depicts an exemplary view of the complete file or folder names that may be normally hidden in a convention viewer when the columns are narrowed.

Figure 7:
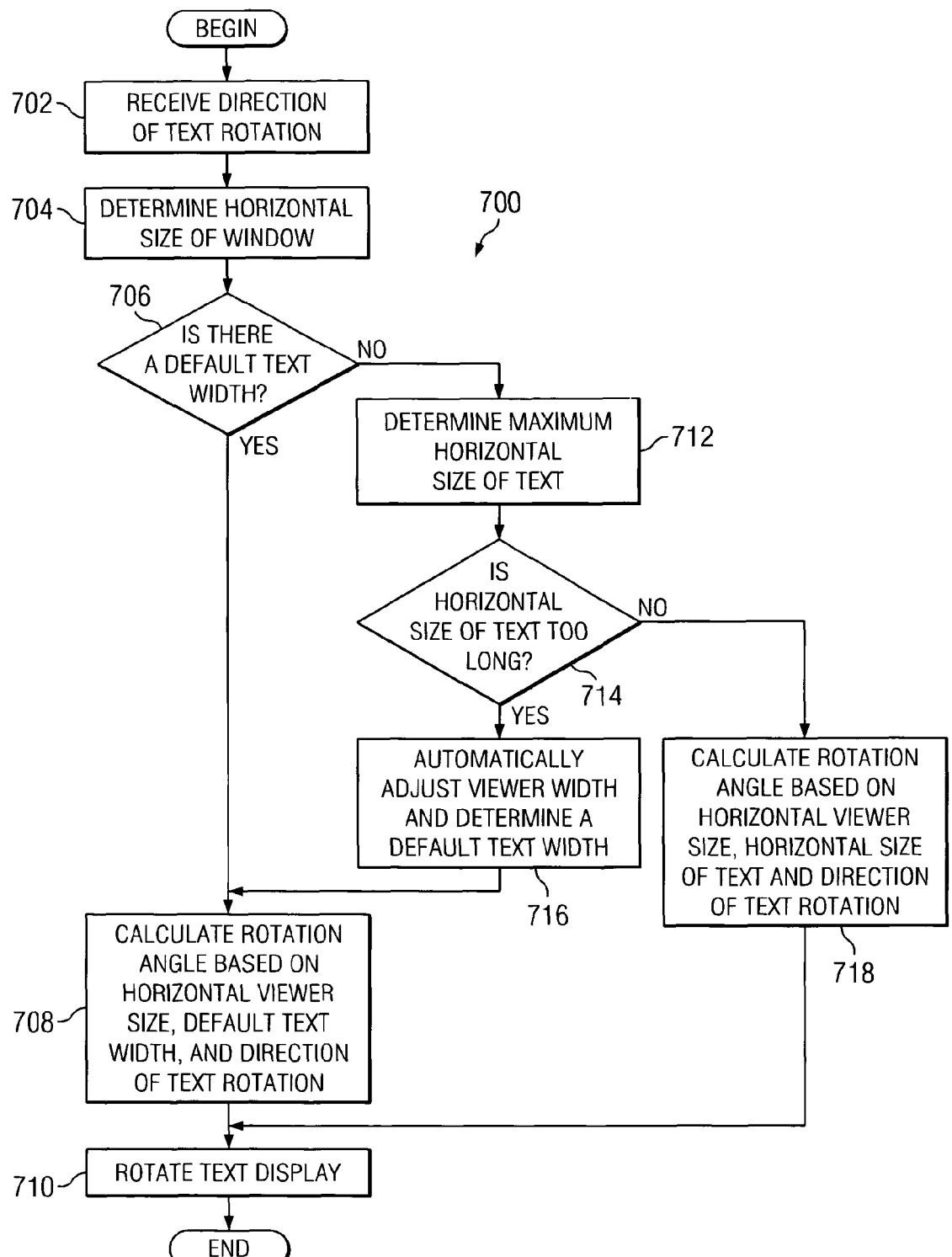
FIG. 7 is a flow diagram illustrating the rendering the complete text of files or folder names within a fixed size viewer in accordance with a preferred embodiment of the present invention.

Turning now to FIG. 7, a flow diagram 700 illustrating the operation rendering the complete text of files or folder names within a fixed size viewer is depicted in accordance with a preferred embodiment of the present invention. The slanted viewing capability may be set as default or triggered by user input through a mouse click, a button, or a modified key whichever is appropriate. The process begins with rotation direction being specified, left-to-right or right-to-left, depending which end provides more details (block 702). Then, it continues with determining the horizontal size of the viewer in which the two-dimensional file or folder text is displayed (block 704). Once the horizontal size of the viewer has been determined, a check is made to see if a default text width has been specified by the user (block 706). If a default text width has been specified, then a rotation angle is determined based on the horizontal size of the viewer, the default text width and the specified direction of text rotation (block 708). Then the two-dimensional text that is displayed in the viewer is rendered using a three-dimensional slanted format that allows the user to see the entire text of the file or folder names within a limited horizontal space viewer (block 710) with the process terminating thereafter.

Returning to block 706, if there is not a default text width specified, a determination is made of the maximum horizontal size of the text within the two-dimensional displayed text (block 712). A determination is then made to see if the maximum horizontal size of the text is too long, which would cause the three-dimensional slanted rendering of the text to be distorted and unreadable (block 714). If the maximum horizontal size of the text is determined to be too long, the width of the viewer may be adjusted automatically and a default text width is determined that would allow the text to be clearly rendered within a limited horizontal space using the three-dimensional slanted format (block 716). Then a rotation angle is determined based on the horizontal size of the viewer, the default text width and the specified direction of text rotation (block 708). Then the two-dimensional text that is displayed in the viewer is rendered using a three-dimensional slanted format that allows the user to see the entire text of the file or folder names within a limited horizontal space viewer (block 710) with the process terminating thereafter.

Returning to block 714, if the maximum horizontal size of the text is determined not to be too long, then a rotation angle is determined based on the horizontal size of the viewer, the maximum horizontal size of the two-dimensional text and the specified direction of text rotation (block 718). Then the two-dimensional text that is displayed in the viewer is rendered using a three-dimensional slanted format that allows the user to see the entire text of the file or folder names within a limited horizontal space viewer (block 710) with the process terminating thereafter.

Figure 8:
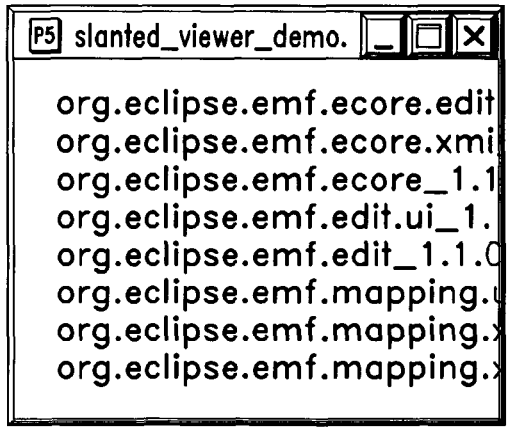
FIG. 8 is a diagram illustrating an exemplary view of file or folder names in a two-dimensional view using a limited horizontal space viewer.
Figure 9:
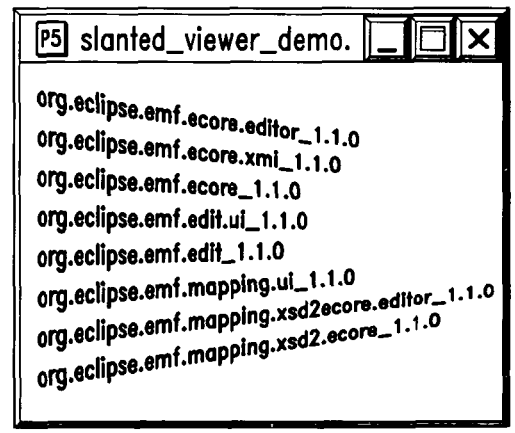
FIG. 9 is a diagram illustrating a two-dimensional slanted viewer of files or folder names in accordance with a preferred embodiment of the present invention.

FIG. 8 depicts an exemplary view of file or folder names in a two-dimensional view using a limited horizontal space viewer. In accordance with an exemplary embodiment of the present invention, FIG. 9 depicts the same files or folder names within a limited horizontal space viewer of FIG. 8 in a two-dimensional slanted view with rotation from left to right after being processed in the manner detailed with respect to FIG. 7.

In summary, the present invention provides a method, apparatus and computer instructions to render two-dimensional text in a three-dimensional slanted angle format. The text graphics are rotated about the y-axis. As a result, the rotated text requires less amount of space along the x-axis (horizontally) but extended along the z-axis (to create depth). Thereby, the full text becomes visible while the horizontal space requirement is retained.

The calculation of the rotation angle is based on the size along the horizontal axis. In order to retain the width of the view area, the lesser the horizontal space, the more the text is rotated. However, the rotation might have distortion effect on the text of the far end. The distortion effect is intensified as the rotation angle increases.

Possible solutions to resolve the distortion are rotating the text in a different direction or using a default text length. In rotating the direction of the three-dimensional slanted text, the user could choose which direction provides the most details that the user deems valuable. With setting the default text width, the width of each column would be automatically adjusted so that all information is displayed properly in the most detailed manner.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The embodiments of the invention in which an exclusive property or privilege is claimed are defined as follows:

1. A method in a data processing system for rendering text in a limited horizontal space, the method comprising:

receiving text to be displayed in a viewer and also a direction of text slanting;

calculating a slanting angle using the direction of text slanting;

slanting the text using the slanting angle to form slanted text; and rendering the slanted text in the viewer in an opposite direction to the received direction of text slanting.

2. The method of claim 1, further comprising:

determining a horizontal size of the viewer; and identifying a text width, wherein the slanting angle is calculated using the direction of text slanting, horizontal size of the viewer and the identified text width.

3. The method of claim 2, wherein the text width is a default text width.

4. The method of claim 2, further comprising:

determining if the maximum horizontal size of the text would cause distortion; and in response to the maximum horizontal size of the text causing distortion, determining a modified text width that would not cause distortion, wherein the slanting angle is calculated using the direction of text slanting, the horizontal size of the viewer and the modified text width.

5. The method of claim 4, wherein the slanting angle is calculated using the direction of text slanting, the horizontal size of the viewer and the maximum horizontal size of the text.

6. A data processing system comprising:

a bus system;

a communications system connected to the bus system;

a memory connected to the bus system, wherein the memory includes a set of instructions;

a processing unit connected to the bus system, wherein the processing unit executes the set of instructions to receive text to be displayed in a viewer and also a direction of text slanting; to calculate a slanting angle using the direction of text slanting; to slant the text using the slanting angle to form slanted text; and to render the slanted text in the viewer in an opposite direction to the received direction of text slanting.

7. The data processing system of claim 6, further comprising:

the processing unit executing a set of instructions to determine a horizontal size of the viewer; and to identify a text width, wherein the slanting angle is calculated using the direction of text slanting, horizontal size of the viewer and the identified text width.

8. The data processing system of claim 7, wherein the text width is a default text width.

9. The data processing system of claim 7, further comprising:

the processing unit executing a set of instructions to determine if the maximum horizontal size of the text would cause distortion; and, in response to the maximum horizontal size of the text causing distortion, determining a modified text width that would not cause distortion, wherein the slanting angle is calculated using the direction of text slanting, the horizontal size of the viewer and the modified text width.

10. The data processing system of claim 9, wherein the slanting angle is calculated using the direction of text slanting, the horizontal size of the viewer and the maximum horizontal size of the text.

11. A computer program product in a non-transitory computer readable medium for rendering text in a limited horizontal space, the computer program product comprising:

instructions for receiving text to be displayed in a viewer and also a direction of text slanting;

instructions for calculating a slanting angle using the direction of text slanting;

instructions for slanting the text using the slanting angle to form slanted text; and instructions for rendering the slanted text in the viewer in an opposite direction to the received direction of text slanting.

12. The computer program product of claim 11, further comprising:

instructions for determining a horizontal size of the viewer; and instructions for identifying a text width, wherein the slanting angle is calculated using the direction of text slanting, horizontal size of the viewer and the identified text width.

13. The computer program product of claim 12, wherein the text width is a default text width.

14. The computer program product of claim 12, further comprising:

instructions for determining a maximum horizontal size of the text;

instructions for determining if the maximum horizontal size of the text would cause distortion; and in response to the maximum horizontal size of the text causing distortion, instructions for determining a modified text width that would not cause distortion, wherein the slanting angle is calculated using the direction of text slanting, the horizontal size of the viewer and the modified text width.

15. The computer program product of claim 14, wherein the slanting angle is calculated using the direction of text slanting, the horizontal size of the viewer and the maximum horizontal size of the text.

16. An apparatus for rendering text in limited horizontal space, the apparatus comprising:

receiving means for receiving text to be displayed in a viewer and also a direction of text slanting;

calculating means for calculating a slanting angle using the direction of text slanting;

slanting means for slanting the text using the slanting angle to form slanted; and rendering means for rendering the slanted in the viewer in an opposite direction to the received direction of text slanting.

* * * * *